June 26, 1962  E. NASSIMBENE  3,040,383
METHOD OF CURING REINFORCED RUBBER-LIKE PRODUCTS
Filed Aug. 25, 1958  2 Sheets-Sheet 1
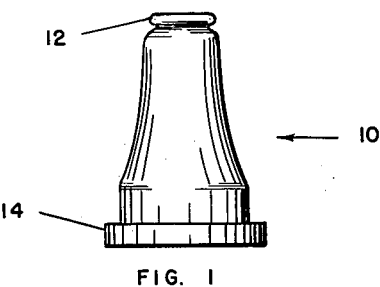
FIG. 1
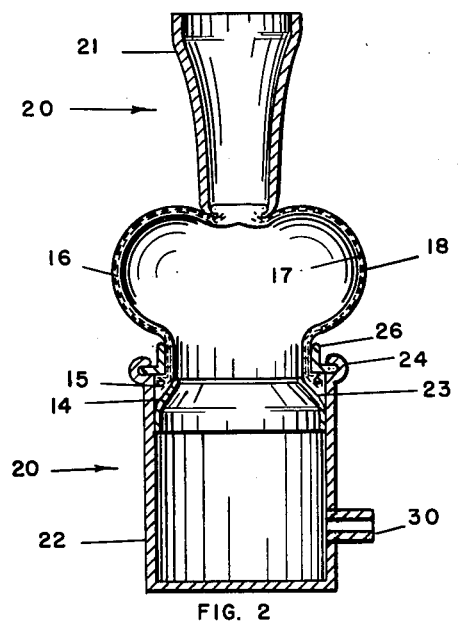
FIG. 2
FIG. 3
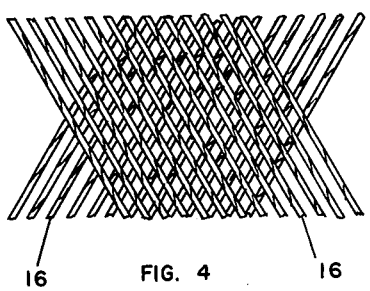
FIG. 4
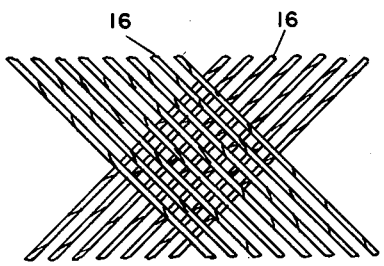
FIG. 5
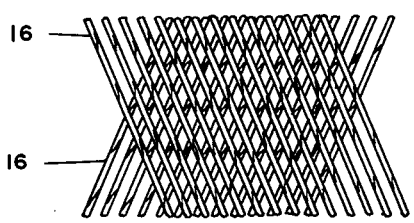
FIG. 6
INVENTOR.
ERNEST NASSIMBENE
BY
ATTORNEY

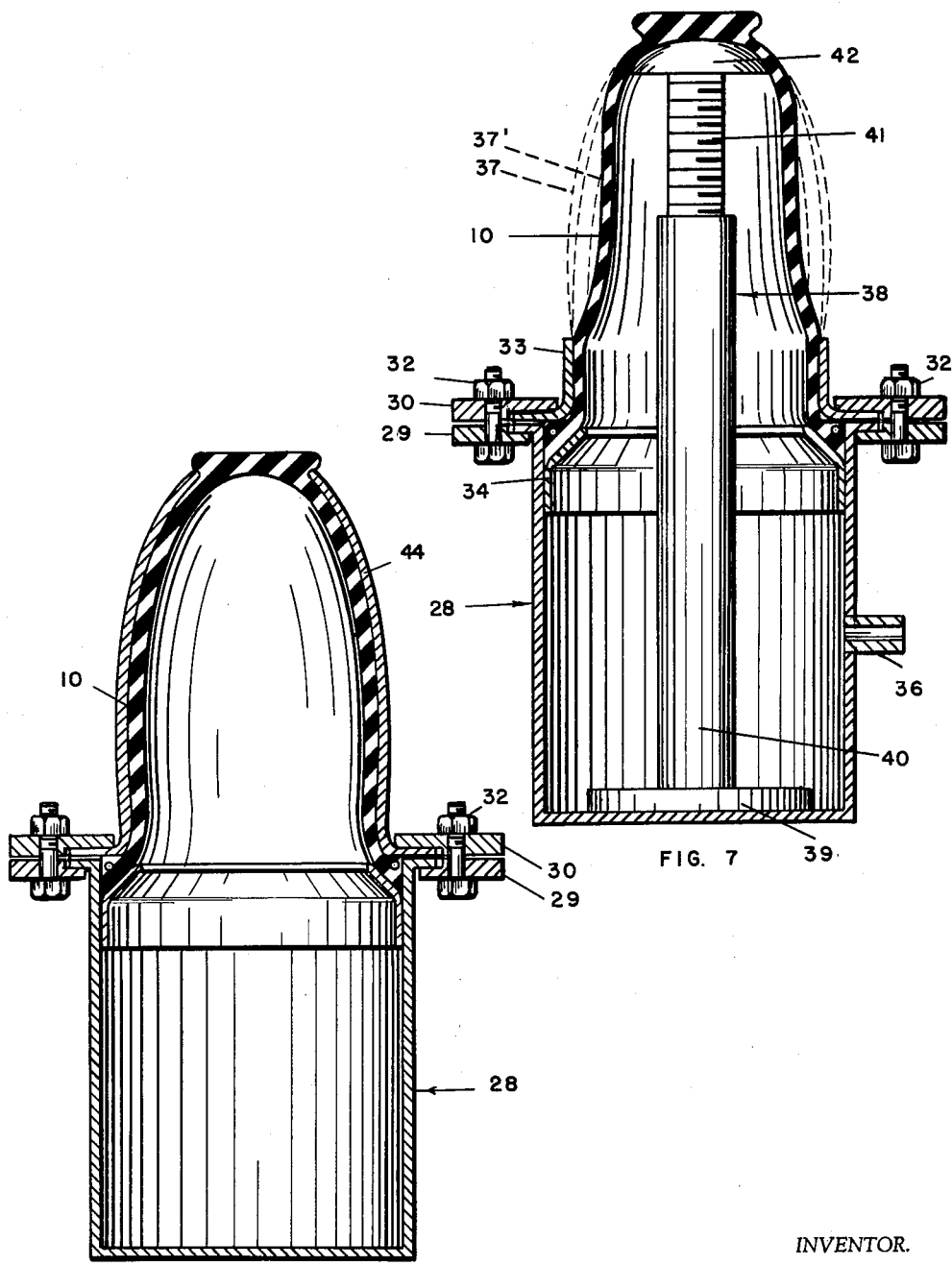

United States Patent Office 3,040,383
Patented June 26, 1962

3,040,383
METHOD OF CURING REINFORCED
RUBBER-LIKE PRODUCTS
Ernest Nassimbene, Denver, Colo., assignor to The Gates Rubber Company, Denver, Colo., a corporation of Colorado
Filed Aug. 25, 1958, Ser. No. 756,930
7 Claims. (Cl. 18—53)

The present invention relates to a method of treating rubber-like articles of manufacture, especially those incorporating some natural or synthetic reinforcement therein; and more particularly, relates to a method of curing reinforced rubber-like articles so as to greatly improve their physical properties.

In the curing or vulcanizing of reinforced, rubber-like articles of manufacture, it is customary to interrupt or supplement the curing process for the purpose of introducing some additional step or treatment phase which will enhance the physical properties of the article. Many of these treatments are localized treatments for the purpose of improving a particular section of the article, or for controlling the properties of a particular material in the article. For example, it has been proposed to preheat the band of material forming the article before it is shaped and placed in the mold in order to soften the rubber in the article before placing any stresses or strain on it in the curing process. Also, in the building and curing of nylon reinforced tires, a post inflation step is commonly employed where, after removing the tire from the mold, the tire is pressurized and then permitted to cool under this internal pressure. Due to the particular characteristic of nylon, which has a tendency to shrink during heating, it has been found that the growth of the tire in operation can be reduced considerably by this step and also tread cracking in the tire can be substantially reduced.

The process of the present invention however departs from presently known methods, including the above, in that it is directed primarily to prestressing under controlled dimensional change the fabric or cord materials incorporated in the carcass of a rubber article, at some intermediate stage in the curing process, then completing the cure in this state so that the fabric and rubber-like materials will become more intimately united under conditions approximating those to which they will be subjected in operation. Several important advantages have been derived from the process of the present invention over those heretofore proposed; the process is conformable for use with virtually all types of reinforced rubber articles, especially inflatable articles and those operating under pressurized systems; also, it improves the flex life of the product especially in that it will extend the period of flex time prior to surface or liner cracking of the product and at the same time minimize the growth of the product in operation so that the dimensions of the product may be more closely controlled. And, in general, it greatly increases the over-all life of the product in that separation between the rubber and reinforcing material is greatly reduced, and the fabric and rubber-like materials are more intimately united in a position during curing which corresponds to the relative disposition of the materials in operation.

It is therefore a primary object of the present invention to provide for a method of improving the physical properties, especially resistance to flex cracking and separation between the materials, of a fabric or cord reinforced rubber-like article of manufacture so as to obtain greatly extended over-all life of the article in use.

It is another object to provide for a method of realignment of rubberized fabric or cord material into a relative disposition corresponding to that which they will assume in operation, so as to materially improve the flex cracking resistance of the resultant article and to increase its over-all life.

It is a further object to provide for a method of curing a fabric or cord reinforced rubber-like article in such a way as to orientate the materials during curing and to align them in a state approximating that which the would assume in opertion, and to do so in such a way as to greatly reduce flex cracking and further, to extend the effective operational life of the article.

It is still a further object to provide an improved method of curing inflatable, reinforced rubber-like articles in which provision is made for controlling the dimensional size of the articles as they are subjected to increased tension at an intermediate stage in the curing operation, and to enable such to be carried out in an effective, dependable manner with a minimum expenditure of time while greatly improving the properties of the articles.

The foregoing and other objects, in accordance with the present invention, may be accomplished broadly in a method of curing reinforced rubber-like articles wherein the article is first initially formed, partially cured in that form to a state or cure below the optimum state of cure based on the tensile properties of the rubber-like material, after which the rubber-like article is stresed or otherwise placed under tension to a predetermined degree, followed by completing the cure under the application of additional heat and pressure while the elements thereof are maintained in the stressed condition. By placing the article under increased tension and in a unique way while the rubber is in a partially cured state and then completing the cure through the application of additional heat, the completed article formed exhibits many substantial advantages.

Other objects and advantages of the present invention will become more apparent from the following detailed description of the invention taken together with the accompanying drawings, in which:

FIGURE 1 is a view illustrating the form of a typical air bellows upon completion of the curing operation.

FIGURE 2 is a section view of the air bellows as it would appear in mounted position in a pneumatic spring assembly in an automobile, illustrating the shape of the air bellows at a full rebound position.

FIGURE 3 is a section view of the air bellows of FIGURES 1 and 2 in a full compression position during operation.

FIGURE 4 illustrates the alignment of the fabric or cord material in the air bellows when in the molded diameter position shown in FIGURE 1.

FIGURE 5 illustrates the alignment of the fabric or cord material when the air bellows are moved to a position corresponding with FIGURE 2.

FIGURE 6 illustrates the alignment of the fabric or cord material in the position as shown in FIGURE 3.

FIGURE 7 is a section view illustrating one mode of carrying out the method of the present in vention with the air bellows mounted, in partially cured condition, onto a pressurizing container for applying force thereto; and FIGURE 8 is a section view illustrating an alternative mode of applying tension in a controlled manner to the air bellows.

With more particular reference to the drawings, there is shown by way of illustration and not limitation in FIGURES 1 to 3, a typical air bellows or diaphragm of the type commonly employed in automobiles, buses, or trucks and which forms a part of the vehicle suspension assembly. It is well known that diaphragms or air bellows when in operation continually undergo dimensional changes because of unbalanced forces exerted thereon as they are constantly moving back and forth in rebound and compression. On account of the forces imposed and the continual change of shape and dimension in application, excessive stresses and strains are generated in the product which may lead to ultimate failure of the diaphragm in a relatively short period of time.

Referring now to FIGURE 1 of the drawings, there is illustrated a typical air bellows or diaphragm 10 shown in molded form, which is generally tubular in configuration, and tapers upwardly into a closed, thickened end portion 12, and with a bead section 14 flaring outwardly at the lower end thereof, having imbedded therein a cable or similar member 15, all well-known in the construction of air diaphragms. The wall or body of the diaphragm is represented to be composed of two superimposed plies of fabric or cord material 16, disposed in an angular relationship both to the longitudinal axis of the diaphragm and with one another, and the fabric material is impregnated with or covered by some impervious rubber-like material to prevent the escape of air therethrough, such as butyl. A sealing layer or liner 17 may be formed on the inside of the diaphragm if desired, although it will be evident that the invention is here not concerned with the materials of which the tubular member is made, as it is well-known that the tubular member can be made impervious in various different ways. Also, of course, various arrangements and angular relationships may be devised in the reinforcement formed by the fabric material. In addition, although for the purpose of illustration, a nylon cord material is desirable as a reinforcement member, it is to be understood that the invention is in no way limited to the type of fabric material and may also include cord, wire, and similar materials, either natural or synthetic.

The diaphragm 10 may be formed upon a drum or mandrel, not shown, wherein the layers of rubber material, together with the rubberized fabric material, are built upon the mandrel in overlapping relation so that the cords are disposed diagonally with respect to the longitudinal axis of the mandrel and the cords in the separate layers are disposed on a different diagonal or bias and angle with respect to one another, all in a well-known manner. A covering layer 18 of rubber-like material may then be placed over the rubberized fabric plies with the cable reinforcement 15 being held in position by the overlapping plies and liner materials.

Upon vulcanizing or curing of the air bellows, generally by a molding process, the air bellows are disposed in connected relation into a spring assembly represented at 20 so that center post 21 engages the closed end 12 thereof and a container 22 engages the lower open end of the diaphragm in sealed relation. As shown, the container 22 is closed at its lower end, and at its upper end is provided with an inturned flange 23 which forms an annular seat for the lower edge of the bead 14, together with an outer spaced lip 24 which curves inwardly in spaced relation from the upper edge of the container for holding a detachable retaining ring 26 in place. Due to the flexibility of the lower wall portion of the diaphragm, the retaining ring may be pressed into position within the spaced lip 24 so as to hold the bead 14 in position against the inturned flange 23. Accordingly, the diaphragm 10 will be free to move inwardly and outwardly through the open end of the container as vibration and shock loads are imposed upon the center post 21, yet will be maintained in sealed relation with the open end of the container 22. Furthermore, in a well-known manner, pressure is supplied from a suitable reservoir to be introduced through an opening 30 in the wall of the container 22 so as to regulate the inward and outward movement of the diaphragm 10 in accordance with the load imposed on the centering post and into the diaphragm in operation. From a comparison of FIGURES 1 to 3, it will be seen that the diaphragm changes from a molded diameter as shown in FIGURE 1, to a much expanded diameter shown in FIGURE 2, and then to a diameter that is smaller than the original diameter, as shown in FIGURE 3. Such a cycling of the diaphragm 10 will thus result in a variation of cord angles as represented in FIGURES 4 to 6. Accordingly, the cord will normally assume an angle as in FIGURE 4 corresponding to the position of the diaphragm in FIGURE 1 wherein the cord angle is that formed between the cords of the layers 16. In the expanded position shown in FIGURE 5, and with the wall of the diaphragm stretched, it will be seen that the cords move to an increased angle with respect to the longitudinal axis of the diaphragm. The cord reinforcement layers then assume a relatively low angle with respect to the longitudinal axis as shown in FIGURE 6 when the diaphragm is in the full compression position. Moreover, in full compression, it will be noted that the diaphragm diameter is reduced and less than the molded diameter thus tending to cause wrinkles in the wall. It will thus be evident that severe stresses and strains are imposed on the rubber-like materials and the reinforcement materials as the card of fabric angle is being continually varied and the diaphragm as a whole stretched and contracted. Of course, additional stresses are imposed on the entire diaphragm due to the internal pressure against the walls which pressure of course varies as the diaphragm is being moved to the various positions. Also, the rubber and fabric material will tend to become prematurely separated as the cord or fabric material is continually varying in angular relationship and also cause the liner or surface of the diaphragm to begin cracking unless the diaphragm is so formed that the rubber is adhered tightly to the fabric.

To minimize premature flex cracking and to greatly extend the over-all life of the product, it is proposed in accordance with the present invention to apply force in a controllable manner to the body or carcass of the diaphragm so as to place the materials under tension and produce a controlled dimensional change at a predetermined, intermediate stage of the curing operation; and, to maintain the dimensional change and increased tension upon the diaphragm as the curing operation is completed under the application of additional heat and pressure. To this end, the method of the present invention contemplates first forming or building the diaphragm upon a mandrel as described, then initially curing the diaphragm in a conventional manner to a predetermined point in the curing cycle. This initial curing operation is preferably done in a mold conforming to the initial shape of the diaphragm, and of course the initial curing time for the diaphragm will depend upon the types and sizes of materials employed. However, it is possible to determine for each particular type and construction of a product the point, in a properly lubricated mold, wherein the rubber will first lose its tackiness to a sufficient extent to permit withdrawal from the mold. Of course, in a natural or synthetic rubber product, this is closely related to the point in the curing cycle where the rubber material will have reached such a state of cure as to prevent blowing or forming of gas in the stock. Moreover, for a particular product and later in the curing cycle it can be determined when the product has reached such a state of cure as to be at its optimum point based on the tensile strength of the rubber material. It is in this area, hereinafter termed the intermediate state of cure, which lies between the initial point mentioned wherein the product can first be removed from the mold to the final point where the product has been brought to such a state as to provide optimum physical properties, especially tensile strength, that the diaphragm is removed from the mold in accordance with the present invention. In this respect it has been found advantageous to remove the article from the mold as close to the initial point as possible.

Upon removal from the mold the diaphragm, as shown in FIGURE 7, may then be connected at its lower bead section 14 in sealed relation with a pressurizing container 28. It will be noted that the container is similar in construction to the container used in the air spring assembly, although it will be evident that any type of pressurizing means may be used in accordance with the present invention. To clamp the bead section 14 in sealed relation to the container, segmental rings 29 and 30 are provided, the lower ring 29 being a stationary member if desired, and the upper ring 30 being a removable segmental ring which is secured into position against the stationary ring 29 by means of suitable bolts 32 so as to hold a retaining ring 33 in position securely against the beads 14. The beads will then be pressed into sealed engagement with inturned flange 33. Upon attachment, fluid pressure in the form of a liquid, gas or air, but preferably air, is then introduced into the container through opening 36 to apply tension to one side of the diaphragm. As shown by the outer dotted line 37, upon application of pressure to one side of the diaphragm, the wall of the diaphragm will be under very much the same force as exists in connected relation in the air spring assembly, as shown in FIGURE 2. At the same time, since the rubber is in a semicured state only, the fabric or cord material will not be so closely restricted by the rubber as it is moved into the expanded position. Accordingly, the realignment of the cord may closely conform to that illustrated in FIGURE 5 except that there is relatively little stress or strain imposed on the rubber in the semicured state.

With the diaphragm in extended position as shown in the outer dotted position, the cure may be completed to produce the finished article. In the final curing operation, additional heat and pressure are applied to the diaphragm, preferably in a steam vulcanizer or in a mold which will permit controlled expansion of the diaphragm. In this connection, it will be noted that some differential pressure should preferably exist between the inside and outside surface of the diaphragm. Thus, with a pressure of 50 pounds upon the inner surface of the diaphragm, the pressure on the outer surface should be somewhat less; for example, about 30 pounds per square inch. Of course as the diaphragm is subjected to additional heat, the internal pressure will rise so as to increase the differential pressure during the final cure, so that the pressure differential will approach that necessary to apply sufficient tension to the materials. Upon completion of the curing cycle, the diaphragm may then be removed from the vulcanizer and detached from the pressurizing container 35 after which the diaphragm is ready for use.

From the above, it will be evident that various means may be utilized in stretching the fabric to the extended position. Also, although the shape of the product more nearly conforms to the diaphragm as it will be in extended position, the main purpose is to apply tension to the elements which will more nearly correspond with that applied in operation so that the semicured rubber will have an opportunity to set against the fabric or cord material in the stretched position and eliminate any tendency to separate or crack in operation. Accordingly, mechanical stretching, hydraulic or fluid means for example may be utilized to pressurize the diaphragm. In addition, the length of time necessary, upon removal of the product from the mold in the semicured state, to pressurize the diaphragm and return it to the vulcanizer is not critical at all and the product may be allowed to stand or set for a limited time before returning it for the final curing operation. Of course, this is particularly true in the case of thin-walled products such as the diaphragm where the material will cool rapidly upon removal from the mold since the cure due to the residual heat in the wall will be suspended soon after its removal. However, heavy-walled objects, where the residual heat within the wall will tend to continue the curing operation upon removal, necessitate the rapid removal, expansion or stretching of the elements and return to the vulcanizer in a very short time so as to put the materials under tension at the correct stage in the curing cycle. In this respect, the present invention is to be distinguished from other curing treatments and methods in that it has been found to be particularly advantageous to apply a predetermined amount of tension to the wall of the diaphragm followed by the application of additional heat to complete the curing cycle. In addition, another feature is that it has been realized to be particularly advantageous to perform the pressurizing operation as soon as possible, which would be at the point where it is first possible to remove the article from the mold.

As shown in the intermediate dotted position in FIGURE 7, upon completion of the curing cycle and after the pressure is released from the inside of the diaphragm, the diaphragm will tend to contract somewhat or return to its original molded diameter so as to assume an intermediate diameter as shown dotted 37' between the extended position under tension and its original molded position. With the use of certain fabrics, particularly synthetic nylon material, this shrinkage will be much greater due to the shrinkage of the fabric material itself, and the diameter will be reduced accordingly.

It is again to be emphasized that the main result to be secured in the curing process of the present invention is to apply increased tension to the materials during the curing operation, although at the same time the shape of the diaphragm should not be unduly distorted in a semicured condition such that it will tend to wrinkle upon reduction in diameter in the compression position in operation because wrinkling also has a tendency to cause separation and premature cracking of the wall which leads to early failure. In order to obviate any possibility of wrinkling, there will be seen from FIGURE 7 a method of stretching or extending the fabric material in a semicured state wherein a center support member 38 is positioned to extend from the bottom of the container 28 to the closed end 12 of the diaphragm. The center support member 38 is designed primarily to control the shape of the diaphragm so that it will not become unduly distorted in operation when the diaphragm is moved to the full compression position as shown in FIGURE 3. To this end, the center support member 38 includes a bottom plate 39 with an upstanding tubular portion 40 which is internally threaded to adjustably receive a threaded stem 41, the stem 41 having at its upper end an enlarged head 42. The head 42 forms a curved outer surface designed to conform to the contour of the inside of the diaphragm at the upper end thereof. The center support member 38 may then be adjusted to the desired height so that the head 42 will engage the closed end of the diaphragm and prevent an inward movement as internal pressure is applied prior to final curing. Thus, without the center support member 38 the diaphragm would be inflated to assume a shape substantially as shown in FIGURE 2; with the center support, the diaphragm has a smaller circumference and greater length for the same amount of tension applied.

It is possible to secure the same results by the use of some restricting exterior contour such as arcuate covered plate 44, as shown in FIGURE 8. From the drawing, it will be noted that the cover plate may form merely an extension of a retaining ring such as the ring 33 shown in FIGURE 7 which curves upwardly and inwardly so as to provide the desired form when the diaphragm 10 is expanded outwardly into engagement therewith. From the standpoint of dimensional uniformity, this form of externally restricted system is preferable due to the more complete control possible over the dimensions of the diaphragm in expanded position. In this connection, it will be evident that various ways of controlling the dimensional expansion of the diaphragm may be devised and that the particular ways of carrying this out as shown in FIGURES 7 and 8 are merely preferred forms of accomplishing the desired objections.

The application of the present invention to air bellows and diaphragms has been found to be particularly unique in results obtained. For example, it has been found possible to increase the average operational life of an air bellows on the order of 100% utilizing the same materials, construction and design. At the same time, it is to be understod that the present invention is related to any product formed of rubber-like materials having a fabric, including cord, reinforcement which operates in a pressurized system. Also, the present invention has particular application wherein the product is forced to change dimension due to greater forces exerted on one side than on the other side. Examples of such pressurized systems would be in the form of a liquid, gas, or mechanical force exerted on one side of the product and for this purpose would include tires, hose, diaphragms or air bellows as described. Moreover, power transmission belts and related articles could be cured or vulcanized in accordance with the present invention merely by stretching the material during an intermediate stage of the curing operation as above described followed by the addition of heat and pressure during the final curing cycle. In relation to any of the above products mentioned, the present invention has particular advantages in that it not only reduces flex cracking, and extends the over-all life of the product, but with the use of many types of fabric reinforcement materials, substantially minimizes the growth of the product in operation, since the size of the material can be extended to a different size in the tensioning operation to take up much of the natural growth of the material. More important, however, is the fact that the final cure will set the materials in their extended positions under tension so as to reduce the strains and stresses in the fabric and rubber-like material in operation.

In accordance with the present invention, it will therefore be understood that the principles of the present invention may be applied to many different types of reinforced, rubber-like materials and products. In addition, many other modifications and changes, particularly in the way in carrying out the method of the present invention, may be resorted to without departing from the scope of the present invention, as defined by the appended claims.

I claim:

1. The method of making an air bellows having a plurality of plies of rubberized fabric disposed at an angle to one another and to the longitudinal axis of the bellows which comprises the steps of forming the bellows with one end adapted for disposition in sealed relation to a container and the other end being closed; curing the bellows in a mold to a state of cure just beyond the "blow" point of the rubber-like material; removing the bellows from the mold; disposing the bellows in sealed relation on a container and applying air pressure to the interior of the bellows so as to subject the bellows to a greater degree of tension corresponding to that to which it will be subjected in operation while controlling the direction of expansion of the bellows under pressure so that the fabric material is reoriented with respect to the surrounding rubber; and completing the cure of the bellows under the application of additional heat while maintaining it under a predetermined degree of tension.

2. The method according to claim 1 wherein the direction of expansion of the bellows is controlled by supporting the closed end against inward movement upon the application of pressure.

3. The method according to claim 1 wherein the direction of expansion is controlled by enclosing the bellows in an enclosure having a contour to yieldingly control the expansion of the bellows upon application of pressure.

4. The method of making an inflatable rubber-like article containing a cavity portion defining an internal volume and including at least one ply of rubberized reinforcing fabric material, comprising the steps of partially curing the article in a mold to a state of cure just beyond the "blow" point of the rubber-like material, removing the article from the mold, increasing the internal volume of the article to a predetermined amount so that the fabric ply material is reoriented with respect to the surrounding rubber followed by completing the cure of the article under the influence additional of heat and differential pressure while the internal volume is maintained at the predetermined amount.

5. The method of making an inflatable reinforced rubber-like article comprising the steps of curing the article in a mold to a state of cure which is below the optimum cure of the rubber-like material, removing the article from the mold, increasing the internal volume of the article until it is constrained from further expansion by means of external restraining elements said expansion causing the reinforcing elements within the article to become reoriented with respect to the surrounding rubber-like material, and completing the cure of the article by means of additional heat while the article is maintained in the expanded condition and restrained by the outer restraining elements.

6. The method of curing an inflatable rubber-like article containing a cavity portion defining an internal volume and containing at least one ply of rubberized reinforced fabric material comprising the steps of curing the article in the mold to a degree just beyond the blow point of the rubber-like material, removing the article from the mold, applying restraining elements about the outside of the article at selected locations, increasing the internal volume of the article to a predetermined amount such that the reinforcing fabric material becomes reoriented within the rubber-like material, applying additional heat to the article while maintaining the internal volume at the predetermined amount and maintaining the external restraining elements around the article until the article is cured to the optimum degree and allowing the article to cool while it is still maintained in its expanded condition with the restraining elements still about the outside of the article at the selected locations.

7. The method of making an inflatable rubber-like article containing a cavity portion defining an internal volume and including at least one ply of rubberized reinforcing fabric material comprising the steps of partially curing the article in a mold to a state of cure just beyond the "blow" point of the rubber-like material, increasing the internal volume of the article to a greater amount so that the fabric ply material is reoriented with respect to the surrounding rubber followed by completing the cure of the article under the influence of additional heat and differential pressure while the internal volume is maintained at the predetermined amount.

References Cited in the file of this patent

UNITED STATES PATENTS

| | | |
|---|---|---|
| 1,365,327 | Kimmich | Jan. 11, 1921 |
| 1,852,085 | Maynard | Apr. 5, 1932 |
| 2,032,508 | Seiberling et al. | Mar. 3, 1936 |
| 2,340,264 | Freeman | Jan. 25, 1944 |
| 2,392,992 | Martin | Jan. 15, 1946 |
| 2,549,144 | Truscott | Apr. 17, 1951 |
| 2,625,981 | Wallace | Jan. 20, 1953 |
| 2,929,101 | Davis | Mar. 22, 1960 |
| 2,929,435 | Hollis | Mar. 22, 1960 |

FOREIGN PATENTS

| | | |
|---|---|---|
| 1,580/56 | South Africa | Jan. 2, 1957 |